United States Patent
Pernot

(10) Patent No.: US 6,297,452 B1
(45) Date of Patent: Oct. 2, 2001

(54) CURVED OR BENT MULTILAYER ARRANGEMENT FOR CONDUCTOR RAILS

(75) Inventor: Christian Pernot, Pontarlier (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/452,216

(22) Filed: Dec. 1, 1999

(30) Foreign Application Priority Data

Dec. 2, 1998 (FR) .................................................. 98 15259

(51) Int. Cl.⁷ .................................................. H02G 5/00
(52) U.S. Cl. .................. 174/68.2; 174/88 B; 174/149 B; 439/212
(58) Field of Search .................. 174/68.2, 70 B, 174/71 B, 72 B, 88 B, 99 B, 98, 148, 149 B; 439/212

(56) References Cited

U.S. PATENT DOCUMENTS 3,818,119 * 6/1974 Sutherland et al. ............... 174/72 B
5,038,257 * 8/1991 Agabekov .......................... 362/219
5,672,070 9/1997 Weiss ................................... 439/213

FOREIGN PATENT DOCUMENTS

| 9113471.4 | 2/1992 | (DE) . |
| 9104651.3 | 6/1992 | (DE) . |
| 29805493U1 | 7/1998 | (DE) . |
| 2298954 | 9/1996 | (GB) . |

* cited by examiner

Primary Examiner—Dean A. Reichard
Assistant Examiner—Adolfo Nino
(74) Attorney, Agent, or Firm—Perman & Green, LLP

(57) ABSTRACT

The present invention relates to a curved or bent multilayer arrangement for conductor rails comprising several electrically conductive strips (1, 2) separated by layers of insulating material. In this arrangement, the conductive strips (1, 2) possess, along the line of the fold in the rail, a number of windows (5) arranged such that the windows of one strip are staggered with respect to those of another, and in which those same windows are sized in such a manner that the conductive strips (1, 2) are not overlaid along the line of the fold.

8 Claims, 2 Drawing Sheets

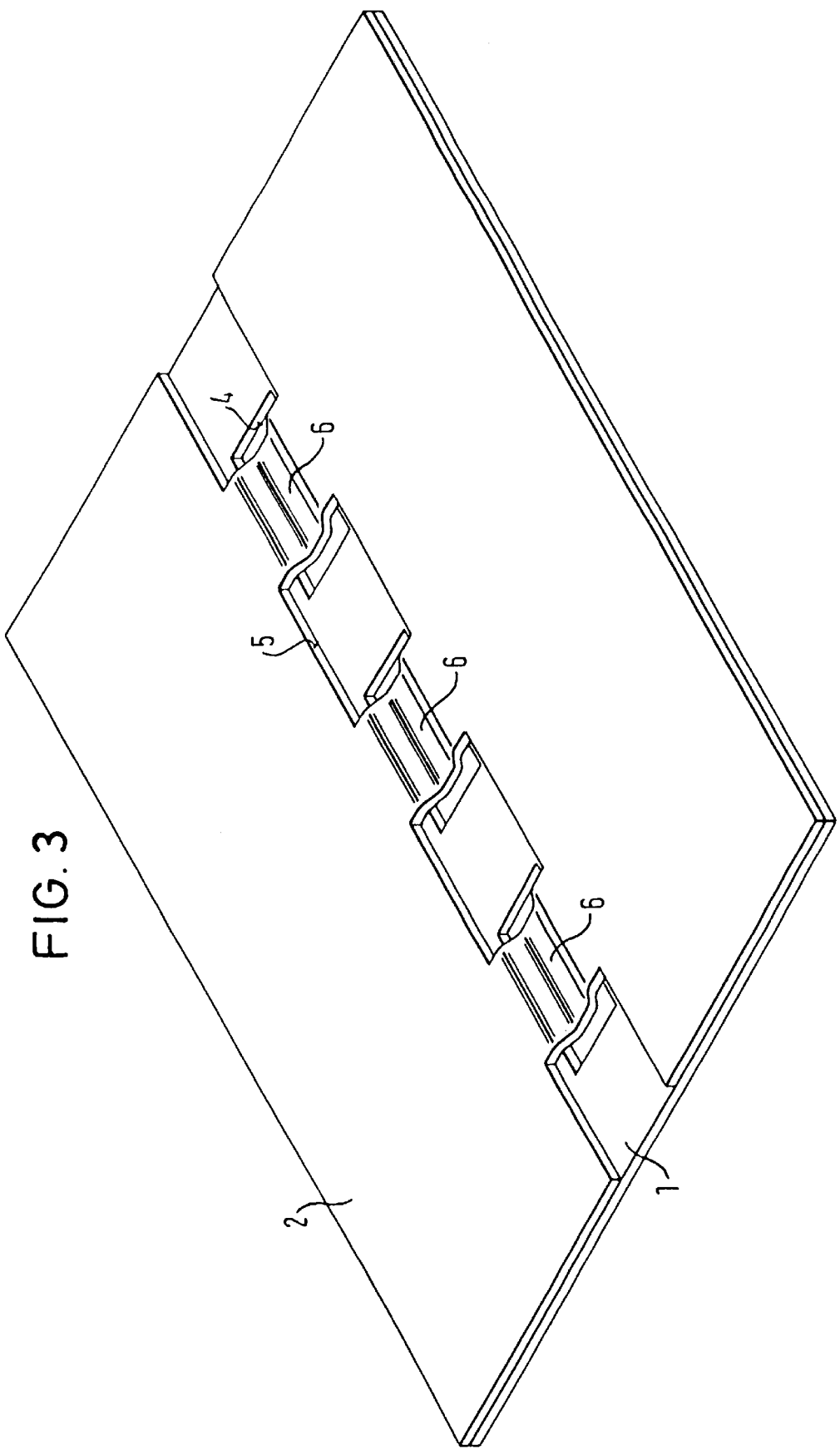

CURVED OR BENT MULTILAYER ARRANGEMENT FOR CONDUCTOR RAILS

BACKGROUND OF THE INVENTION

1. Field of the Invention

The present invention relates to an arrangement for multilayer electrical conductor rails, and more particularly to a curved or bent multilayer arrangement for conductor rails comprising several electrically conductive strips separated by layers of insulating materials.

At the present time, conductor rails are used with increasing frequency in a large number of technological fields. These rails are also entering new domains, such as, for example, the automotive field. Such conductor rails (also termed "bus bars") are formed of electrical conductors in the form of strips or sheets each separated from each other by insulating layers. For this purpose, relatively thin sheet material is used as the insulating layer in order to ensure that the final assembly of conductors is comparatively compact. When the conductor rails are manufactured, it is the case in a number of applications that they need to be bent sharply or curved. If the curve radius at an elbow in the rail is too small for standard bus bars, or if, due to the fact that there are several different superimposed layers, when a rail is curved, the outer layers are subjected to high levels of stretching, thereby causing electrical problems at the point where the rail bends sharply. The insulating layers may be stretched and become excessively thin, with the result that breakdown voltage may occur between the conductors separated by the insulating layer, which may in turn, due to generation of heat or the formation of sparks, in addition to the formation of ozone, damage or even destroy the insulating layer, to a point where short-circuits may occur.

Each of the outer faces of assembled rails should preferably be provided with a thin layer of electrical insulation. The external insulation is thus complete in the area of the bend in the rail and must be arranged in a manner ensuring the elimination of all air.

SUMMARY OF THE INVENTION

The present invention is intended to perfect the arrangements of electrical conductor rails of the type described above in the introduction, in such a manner as to allow problem-free manufacture and fitting, even in cases where the rail is bent sharply with a very small radius of curvature, and to avoid prejudicing proper operation of such conductor rail arrangements in future use.

The above objectives are achieved by a curved or bent multilayer arrangement for conductor rails comprising several electrically conductive strips separated by layers of insulating material and characterized by the fact that the conductive strips possess, along the line of the fold in the rail a number of windows arranged in a manner ensuring that the windows of one strip are staggered with respect to those of another, and in which those same windows are sized to ensure that no conductive strip overlays another on the line of the fold.

The fundamental concept underlying the present invention is the avoidance, in the area of an elbow in the conductor rail arrangement, of a configuration in which several conductive strips are overlaid, surrounding a layer of insulation which may become stretched or compressed. For this reason windows are cut into the conductive strips, these windows being staggered in each strip with respect to those of any other strip. The result is that any portion of a strip located between two windows is invariably aligned opposite a window in the sheet placed immediately above it.

The invention is described in greater detail below by means of a description of one embodiment and with reference to the drawings. The latter show the following:

BRIEF DESCRIPTION OF THE DRAWINGS

FIG. 3: a detailed view of the area of an elbow bend in a conductor rail as shown in FIG. 1.

DETAILED DESCRIPTION OF THE INVENTION

Figure 1:
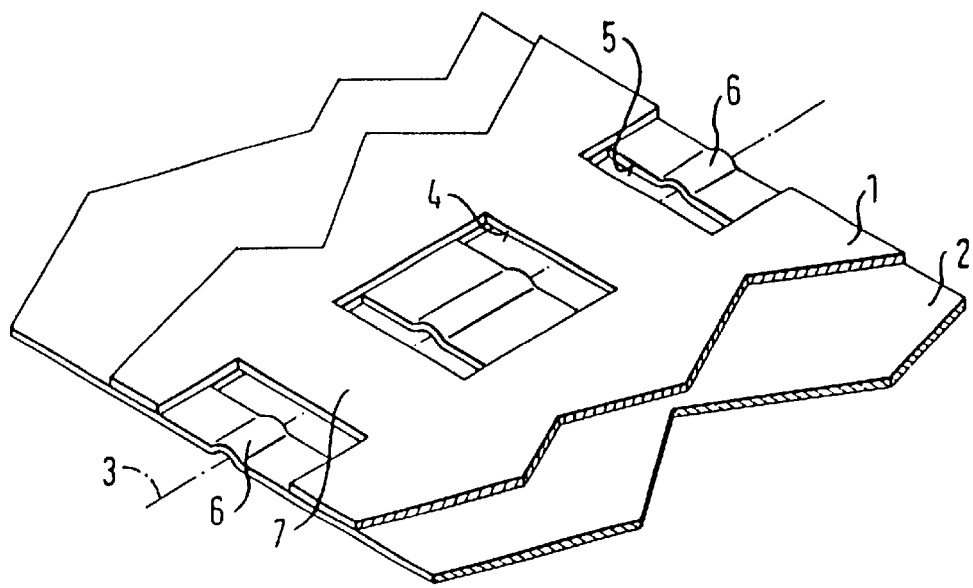
FIG. 1: two conductive strips or sheets prior to folding.
Figure 2:
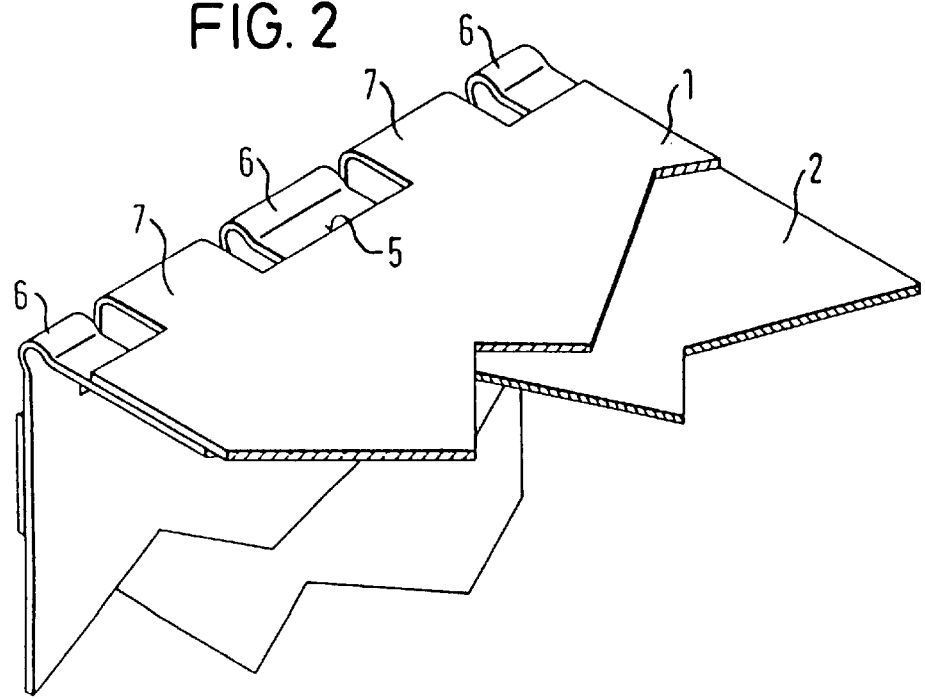
FIG. 2: the conductive strips as shown in FIG. 1 after folding.

FIG. 1 shows a conductor rail multilayer arrangement comprising two such rails 1 and 2. The layer of insulation material interleaved between them is not shown. It can be easily seen in the upper conductive strip 1 that there are rectangular windows 4 which are spaced at intervals along the line of the elbow of the rail 3, the distance between the windows being slightly smaller then the length of the window edge. In conductive strip 2 there are also windows 5 which are identical to windows 4 in the upper conductive strip 1, with the difference that they are arranged in order to be staggered around the elbow of the rail 3 in such a manner that the portions located between the windows 5 are approximately centered on the windows 4 in the upper conductive strip 1. It can also be seen that there is a raised or domed portion in FIG. 1, which therefore forms a hollow as seen from underneath, on the line of the fold in the rail 3 itself in the portions located between the windows 5 of the conductive strip 2. In this area, the metal sheet forming the lower conductive strip is raised to the level of the metal sheet forming the upper conductive strip in such a manner that when the rail 3 is bent to form the elbow, as can be seen clearly in FIG. 2, the corners of the folds in the respective portions between the windows of the two conductive strips 1 and 2 are all at the same level. The windows 4, 5 in one of the conductive strips 1, 2 are wider by several millimeters than portions 7 of the other conductive strips 1 and 2 which are located between them in such a manner as to insure the presence of an insulating gap between the portions 7 of the various layered strips 1 and 2. In addition, it can be clearly seen in FIG. 2 that this arrangement allows very small radii of curvature to be used in view of the fact that no damage to the insulating material need be feared. In the arrangement described above, it is possible when punching out windows 4 and 5, to punch out simultaneously a sheet of insulating material, which may possibly be glued to the conductive strip, or it would be possible to include, after punching out windows 4, 5, a continuous sheet of insulation material between the conductive strips 1 and 2 which could come through the strip in the area of the windows. It would also be possible to allow the insulation sheet to overlap by several millimetres the edges of the windows 4, 5.

FIG. 3 shows a variant of the arrangement and configuration of windows 4, 5 and raised or domed portions 6. Due to the fact that the interval between the windows is as small as possible, making it possible to optimise the cross-sectional area of the current conductor, there are in practice no electrical problems in the rail in the area around the fold in the conductors, with the result that the inductance of the multilayer arrangement structure is only minimally affected. This is because the length of the connection strips is reduced maximally on the curve radius, with the result that any such problem is very significantly reduced.

Lastly, the alternating windows provide a visible indication of the prescribed locations for folding the rail, since it will fold more easily at these points, due to the reduced thickness of the metal sheet, than at other points, where several conductive strips are overlaid.

Such an arrangement stands up well in all cases to partial electrical discharge, even at high levels of voltage. This is because it enables the rail to be bent or curved after polymerisation without affecting its electrical properties, particularly its resistance to electrical breakdown or partial discharge. Moreover, the insulation will not be affected in any way in the area of the bend in the rail since no internal insulation layers are present in that area. Similarly, it guarantees the elimination of all heat-related problems in the area of the bend, since the conductive cross-sections are designed to be sufficient and the surface areas of the conductors on either side of the fold will act as heat sinks if this should be necessary. Finally, the fact that this arrangement occupies much less space is an advantageous factor, since it allows much more compact designs to be achieved for electronic power supply systems.

The present invention thus combines the benefits of easy handling with those of a concurrent improvement in safety, in addition to the considerable advantages possessed by such arrangements compared with conventional curved or bent multilayer arrangement conductor rails.

What is claimed is:

1. A curved or bent multilayer arrangement for conductor rails comprising several electrically conductive strips separated by layers of insulating material wherein the conductive strips possess, along a line of the curve or bend in each of said rails, a number of windows arranged in a manner ensuring that the windows of one strip are staggered with respect to the windows of another strip, and in which those same windows are sized to ensure that no conductive strip overlays another on the line of the curve or bend.

2. A curved or bent multilayer arrangement for conductor rails as described in claim 1, in which the electrically conductive strips located on an inside face of an elbow possess, on a side toward an outer corner of an elbow bend, between the windows, a portion which is raised or domed in such a manner that all the conductive strips are at the same level along the line of the curve or bend in the conductor rail.

3. A curved or bent multilayer arrangement for conductor rails as described in claim 1, in which the windows are rectangular and symmetrically arranged with respect to the line of the curve or bend.

4. A curved or bent multilayer arrangement for conductor rails as described in claim 1, in which the windows in a conductive strip are wider by several millimetres than portions of the other conductive strips which are located between them in such a manner as to insure the presence of an insulating gap between the portions of the various layered strips.

5. A curved or bent multilayer arrangement for conductor rails as described in claim 1, in which the insulating layers between the conductive strips are not perforated in an area of the curve or bend in each of said rails.

6. A curved or bent multilayer arrangement for conductor rails as described in claim 1, in which the insulating layers are punched out together with the conductive strips by the windows.

7. A curved or bent multilayer arrangement for conductor rails as described in claim 1, in which the radius of curvature at the curve or bend in each of said rails is about two millimetres.

8. A curved or bent multilayer arrangement for conductor rails as described in any of the claims described above, in which the angle of the curve or bend is 90°.

\* \* \* \* \*